Feb. 29, 1944.  J. E. KLINE  2,343,013
HONING TOOL FOR TUBES
Filed Dec. 13, 1940  2 Sheets-Sheet 1
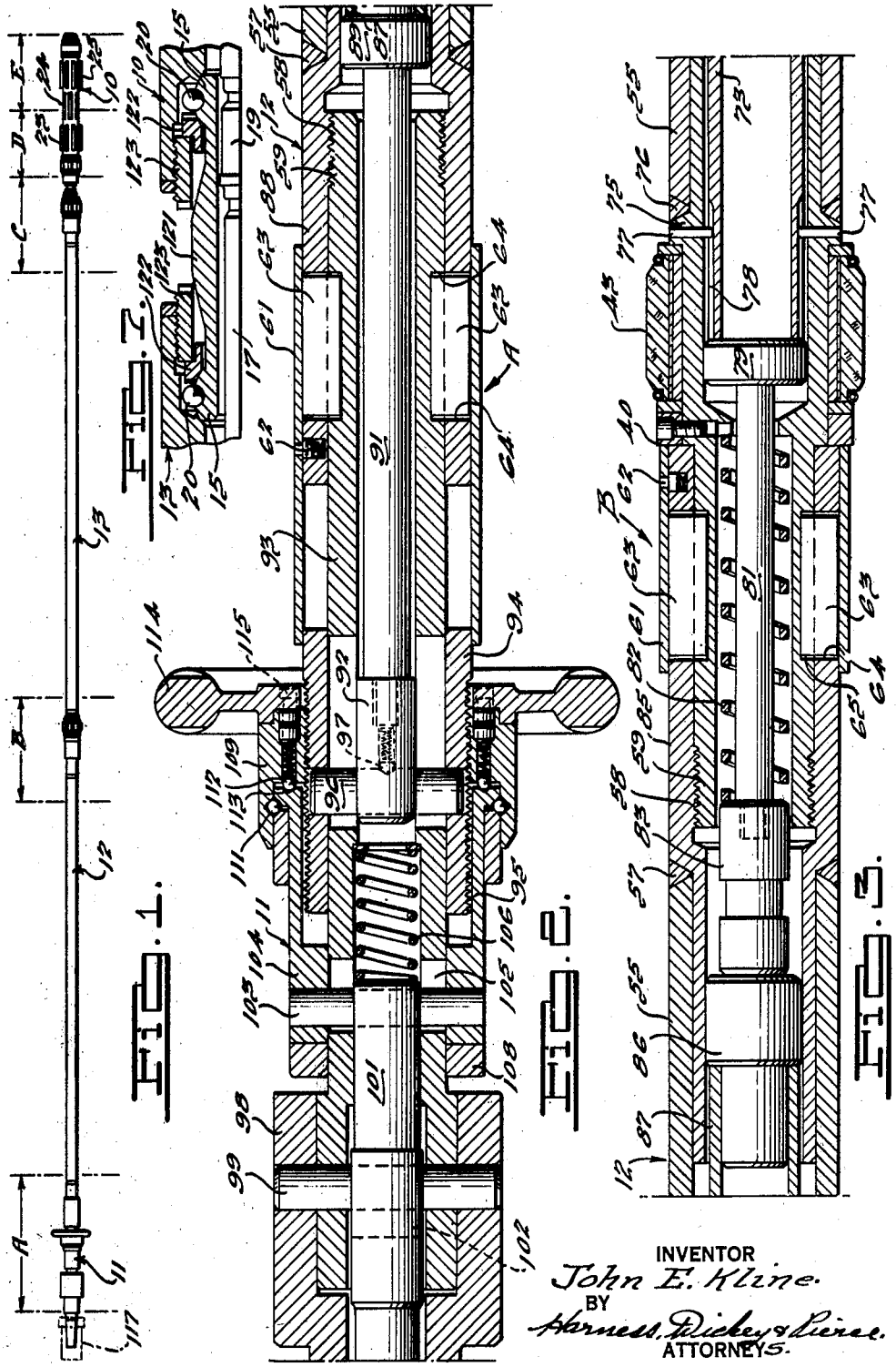

Feb. 29, 1944.  J. E. KLINE  2,343,013
HONING TOOL FOR TUBES
Filed Dec. 13, 1940   2 Sheets-Sheet 2
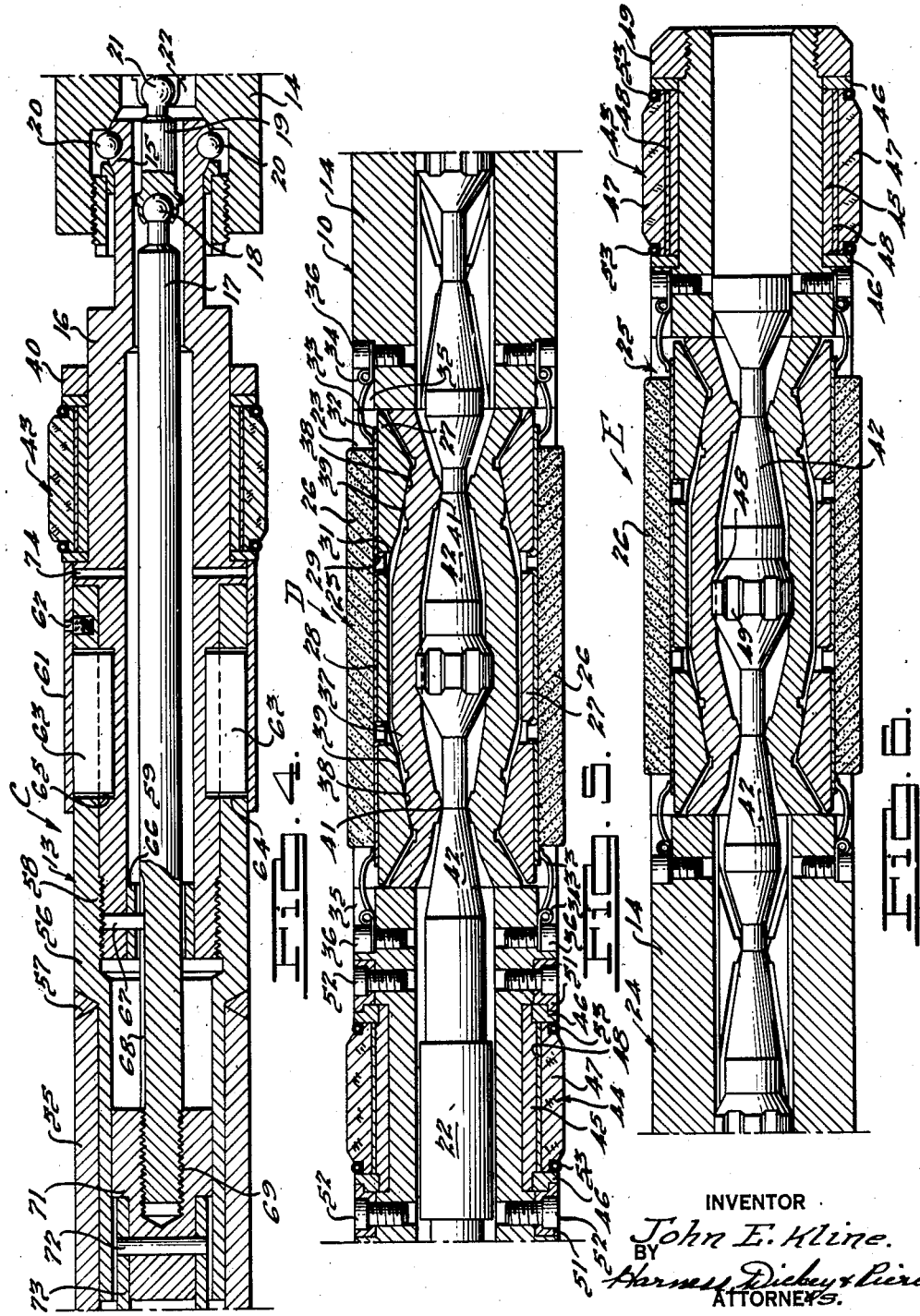
INVENTOR
John E. Kline.
BY
Harness Dickey & Pierce.
ATTORNEYS.

Patented Feb. 29, 1944

2,343,013

UNITED STATES PATENT OFFICE 2,343,013

HONING TOOL FOR TUBES

John E. Kline, Grosse Pointe Farms, Mich., assignor to Micromatic Hone Corporation, Detroit, Mich., a corporation of Michigan Application December 13, 1940, Serial No. 369,925

12 Claims. (Cl. 51—184.3)

My invention relates to honing tools, and particularly to a honing tool for machining the walls of cylindrical tubing of considerable length.

The present invention comprises a tool body having a plurality of annularly disposed sets of abrasives with the adjacent sets circumferentially offset from one another and having guiding elements to align the body of the tool with the axis of the bore. A plurality of sections of tubing formed in extension of the body are likewise provided with guides to maintain the axis of the sections disposed in alignment with the axis of the bore. A short universal coupling is provided between the ends of the sections of tubing and the tool to prevent weight of the sections from being transferred to the tool so that the tool is free to follow the axis of the bore. When a short section of tubing is employed for short bores, a universal connection is employed which joins the driving end of the tool with the tool body while an actuating element extends through the driving end. A universal connection is provided between the actuating member within the body which controls the radial position of the abrasive elements and the actuating element therefor within the sections.

On the opposite end of the tubular sections to that secured to the tool driving end, adjusting mechanism is provided by which the central actuating member is moved longitudinally to radially position the abrasive stones. A suitable supporting and driving head is attached to the adjusting head by which the tool is driven in rotation and reciprocation, and through which the adjusting mechanism is actuated. Means are provided for removably attaching the adjusting head to the tubular section, the tubular sections to each other and for joining the tubular sections to the tool driving end. The connections are readily attachable, detachable, and interchanged, so that the tool and tubular extensions may be quickly separated or quickly joined to each other, the adjusting head, and the tool.

Accordingly, the main objects of my invention are; to provide a honing tool made up of a plurality of sections which are readily attached and separated; to provide a honing body having a tubular extension with an adjusting head which is releasably secured thereto and which controls the radial position of the abrasive stones of the tool body; to provide a plurality of releasable sections forming a honing tool, each of which is provided with a guiding element to maintain the tool body and sections in axial alignment with the axis of the bore; to provide an adjusting head with means for radially positioning the abrasive stone of the tool and with a driving end through which the adjusting head may be further shifted to further control the position of the abrasive stone; and in general, to provide a tool for machining bores of extended length, which is simple in construction, positive in operation, and economical of manufacture.

Other objects and features of novelty of my invention will be either specifically pointed out or will become apparent when referring, for a better understanding of my invention, to the following description taken in conjunction with the accompanying drawings, wherein:

Figure 1 is a view in elevation of a honing tool embodying features of my invention;

Fig. 2 is an enlarged sectional view of the left-hand end of the tool illustrated in Fig. 1, indicated by the letter A;

Fig. 3 is an enlarged sectional view of the central joining portion of the tool illustrated in Fig. 1, indicated by the letter B;

Fig. 4 is an enlarged sectional view of the left-hand end of the tool portion illustrated in Fig. 1, indicated by the letter C;

Fig. 5 is an enlarged sectional view of the central portion of the tool illustrated in Fig. 1, indicated by the letter D;

Fig. 6 is an enlarged sectional view of the right-hand end of the tool portion illustrated in Fig. 1, indicated by the letter E, and Fig. 7 is a broken sectional view of a universal coupling employed between the honing tool and the tubular driving sections.

In Fig. 1, I have illustrated a tool comprising a honing body 10, a driving and adjusting head 11, and tubular sections 12 and 13, any number of which can be employed, depending upon the length of the cylinder to be honed. Suitable guiding elements are provided on the body and sections by which their axes are maintained aligned with the axis of the bore being honed, and the weights of said body and tubular sections are solely supportable by their respective guiding elements.

The hone body 10, illustrated in Figs. 4, 5, and 6, comprises a tubular element 14 having a universal connection 15 with the driving end 16 which is joined to tubular section 13. An adjusting rod 17 extends through the driving end 16 and universal connection 15, and has a ball and socket connection 18 with the universal element 19 which has a ball and socket connection 21 with the tool body adjusting element 22. Balls 20 disposed in slots in the tubular element 14 are the means by which the tool body is driven in rotation while the rod 17, operating through the universal element 19, may longitudinally move the tool body adjusting element 22 to produce the radial movement of the stones 26.

The tubular element 14 of the tool body is provided with a set of longitudinally disposed slots 23 which are in circumferentially offset relation with adjacent slots 24 whether or not they may be in aligned relation with slots 25 which are spaced apart and disposed annularly about the element 14. Within the slots 23, 24, and 25, sets of abrasive stones 26 are mounted on radially movable shoes 27. The abrasive stones 26 are adhesively or otherwise secured to a metal backing element 28 having rearward projections 29 which extend into apertures 31 in the shoes 27 to prevent endwise movement therebetween. The backing elements 28 extend, at 32, beyond the ends of the stones 26 and are engaged by the ends 33 of springs 34 which are nested within slots 35 which are disposed in aligned relation with the apertures 23, 24, and 25 secured in position by screws 36.

The shoes 27 are of less length than the slots to permit the shifting and tilting of the shoes on adjusting plates 37 which have arcuate cam portions 38 upon which the inner surfaces 39 of the shoes engage. The inner faces of the adjusting plates 37 are provided with spaced knife edges 41 which are engaged by the conical surfaces 42 disposed on the adjusting element 22. A pair of conical surfaces 42 are provided opposite each of the series of annular slots 23, 24, and 25 to operate the abrasive stones 26 mounted therein, radially outwardly when the element 22 is shifted to the right and to have the abrasive elements move radially inwardly, through the force of the spring 33, when the element 22 is moved to the left, as viewed in the figures.

At the lower end of the tubular element 14 a guide bushing 43 is provided for guiding the lower end of the tool body 10 relative to the cylindrical surface being honed. A similar bushing 44 is provided near the upper end of the tubular element 14 for the purpose of guiding the opposite end of the tool body 10 within the bore.

The bushings comprise a ring 45 which rotates on the tubular element 14 of the body having axial thrust washers 46 at each of its ends. A plurality of bore engaging elements 47 are mounted between the washers 46 which have a base 48 of cork or other resilient material abutted against the outer surface of the ring 45. The bushing 43 at the end of the tool body is retained in position by a nut 49 while a pair of shouldered rings 51 retain the washers 46 and the ring 45 in positon. In the bushing 44, the rings are split radially so as to be mountable upon the body, the unit being locked in position by a plurality of screws 52 which secure the rings 51 in position. The annular ring 45 and the annular thrust washers 46 on the bushings 43 may be continuous as these may be mounted over the end projection of the tubular element 14.

The plurality of the bore engaging elements 47 are removably secured against the outer face of the ring 45 by a pair of garter springs 53. The bore engaging elements may be removed when worn or replaced by other guiding elements to guide upon a larger or smaller bore and are permitted to move a slight amount radially through the compression of the cork or other resilient material 48.

The tool body 10 is guided at both ends by the bushings 43 and 44 which are rotatably mounted on the tool body to have the tubular body 14 rotate relative thereto while the bore engaging elements 47 are required to move only in reciprocation relative to the bore. The adjusting element 22 is moved to the right as viewed in the figure during a honing operation for moving the adjusting plates 37 radially outwardly. This moves the shoes 27 and, therefore, the abrasive stones 26 outwardly under predetermined pressure to machine the wall of the bore as the tool body is rotated and reciprocated. After the abrasive operation, the movement of the adjusting elements 22 to the left permits the adjusting plates 37 to move radially inwardly therewith under the influence of the pressure stored in the springs 34. The abrasive stones will then be out of contact with the bore wall in view of the support of the tool body on the axis of the bore by the bushings 43 and 44. The tool may then be withdrawn from the bore without danger of scratching the finish produced by the honing operation.

Referring more specificaly to Figs. 3 and 4, the tubular sections 12 and 13 between the adjusting head 11 and the abrading tool body 10 will now be described. While two of the tubular sections are illustrated in Fig. 1, it is to be understood that one or any number of sections may be employed, depending on the length of the bore to be machined. The tubular section 13 comprises an outer tube 55 having on the end adjacent to the tool, a coupling section 56 secured thereto by suitable means herein illustrated as by welding 57. The coupling section 56 contains an internal thread 58 in which the mating threaded end of coupling section 59 of the driving end 16 of the tool may be threaded.

A sleeve 61 is adjustable lengthwise upon the body 56 being retained in position by a spring-pressed plunger 62 which projects within an aperture in the sleeve. The sleeve is the means by which a plurality of keys 63 are retained in slots 64 in the body 56 and in the keyways 65 in the driving end 16 of the tool. A guide bushing 66 for the adjusting rod 17 of the tool is mounted on the inner wall of the threaded projection 59 through which a pin 67 extends into a slot 68 in the rod to prevent the rod from turning relative to the drawing end 16. The projecting end of the rod 17 is provided with threads 69 by which the rod is attached to a head 71 slidable within the body 56. The head is secured by a pin 72 to a hollow tube 73 disposed within the tube 55. When the tool is to be detached from the tubular section 13 the plunger 62 is released from the sleeve 61 and the sleeve is moved to the left to permit the keys 63 to be removed. Thereafter the tool adjusting end 16 is screwed out of the body 56, the rod 17 being screwed from the head 71 by the same movement because of the pin 67 which forces the rod 17 to turn with the tool driving end 16. The thread 69 on the rod is the same as the thread 58 on the body.

A guide bushing 43, smiliar to the guide bushing 43 on the end of the tool body, is provided on the driving end 16 of the tool for positioning the end and therefore the end of the section 13 relative to the bore being machined. Apertures 74 are provided in the end 16 for the purpose of draining any coolant employed during the honing operation therefrom. For attaching the tool, a reverse operation occurs, the rod 17 being threaded into the head 71 the same time as the threaded end 59 of the driving end 16 of the tool is being threaded upon the threads 58 within the body 56. Thereafter the keys 63 are placed in the slots 64 and the keyways 65 and the sleeve 61 is moved to the right as viewed in the figure where it is secured in position by the plunger 62.

The opposite end of the section 13 is illustrated in Fig. 3. A body 75 is secured to the end of the sleeve 55 by suitable means herein illustrated as by welding 76. The opposite end of the tube 73 from that secured to the head 71 terminates within the body and is maintained against rotation by a pair of pins 77 which project into slots 78 in the tube end. This prevents the tube from turning when the rod 17 is being threaded into or out of the head 71. The end of the tube 73 abuts against and is secured to head 79 mounted on the end of a rod 81 which is biased to the left by a spring 82 abutted against a head 83 which is threaded on to the end of the rod 81. The coupling section 75 is provided with keyways 65 in which keys 63 may be mounted. The outer end of the coupling section 75 has a threaded end 58 by which attachment is made to the adjoining coupling section 12. A guide bushing 43 is mounted on the section 75 for guiding the outer end of the tubular section 13 and the inner end of the tubular section 12. The bushing is maintained in position by a ring 40 secured to the coupling section 75.

The tubular section 12 comprises a tube 55 having a coupling 85 secured thereto by a suitable means herein illustrated as by welding 57. The coupling contains an internal threaded end 59 in which the threaded end of the coupling 75 is secured. A head 86 is mounted within the coupling 85 abutted against the head 83 which is screw threaded on the rod 81. The head is carried by a tube 87 which is disposed within the tube 55. A sleeve 61 is mounted on the coupling 85 and maintained in position by the plunger 62. The sleeve maintains the key 63 in position within the slots 64 in the coupling 85 and the keyways 65 in the coupling 75. This secures the two sections in rigid driving relation.

The opposite end of the tube 55 is secured to a member 88, which is similar to coupling section 85, by suitable means herein illustrated as by welding 57. The tube 87 is secured to a piston head 89 which is carried by a rod 91 which projects through the member. The rod 91 has its ends threaded on the rod 92. A sleeve 61 is mounted over the member 88 maintained in position by a plunger 62. A sleeve maintains the keys 63 in position in the slots 64 in the body and the keyways 65 in a tubular body 93 of the adjusting head 11. The member 88 is provided with threads 58 while the body 93 has a threaded end 59 by which the bodies are joined together. The keys 63 maintain the bodies in rigid driving relation so that the coupling section 12 may be operated by the adjusting head 11.

The body 93 of the adjusting head 11 carries a sleeve 94 having an external thread 95. A pin 96 projects through the sleeve and through the rod 92 being maintained in central relation by a spring pressed ball 97. The body 93 is secured to the driving head 98 by a pin 99. A plunger 101 is mounted within the body 93 having a slot 102 through which the pin 99 projects. A pin 103 connects the plunger to an outer sleeve 104 and is movable within a slot 105 provided in the body 93. A spring 106 urges the plunger 101 to the left, as viewed in the figure, against a ring 108 secured by suitable means on the body 93. A threaded sleeve 109 is fixed to the sleeve 104 by a ball bearing connection 111 while being rotatably disposed relative thereto. A plurality of spring-pressed balls 112 operating in notches 113 in the outer face of the sleeve 104 positions the threaded sleeve 109 relative to the sleeve 104.

A hand wheel 114 is secured to the threaded sleeve 109 by screws 115. By adjusting the hand wheel 114 the sleeve 94 is moved to the right or left upon the body 93 moving the rod 91, the tube 87, the rod 81, tube 73, head 71 and rod 17 therewith. This adjusts the position of the stones radially relative to the bore while pressure may be provided on the stones through actuation of the plunger 101 longitudinally to provide a feed movement to the abrasive stones radially outward during the machining operation.

The driving head 98 of the tool is secured to a driving end 117 of the honing machine through which a rod, which may be loaded by fluid, a spring or the like, abuts against the end of the plunger 101. At the end of the honing operation the removal of the pressure on the plunger 101 will permit the spring 106 to move the plunger to the left while the spring 82 in the section 13 moves the remainder of the adjusting elements to the left, permitting the springs 34 to move the abrasive stones radially inward.

It is to be understood that each additional section 13, which may be employed for lengthening the tool, will contain a spring 82 so that sufficient force will be present to assure the movement of the adjusting element 22 of the tool to the left so that the springs 34 will have sufficient force to move the abrasive stones radially inwardly. After the stones have become worn or are to be adjusted for a different diameter, the hand wheel 114 is rotated to produce the diameter desired from which the stones are further expanded by the plunger 101 during the abrasive operation.

One or two sections 12 or 13 are employed with the tool 10 for bores of shorter length. A universal connection 15 may be employed between the tool and the section and some of the weight of the section may be taken by the tool. However, when the sections are heavy and a number are employed, I utilize a complete universal coupling 121 as illustrated in Fig. 7. A universal connection 15 is formed on each end of the coupling with the tool 10 and the tubular section 13. Balls 20 are disposed in slots in each end of the tool and tubular section with the ball and socket connection completed by annular rings 122 retained in position by the threaded collars 123. The coupling has complete universal movement with the tool and the tubular section while having a driving relation in rotation therebetween in view of the balls 20. The operating rod 17 has complete universal movement through the universal connection 19 with the actuating element of the tool so that none of the weight of the tubular sections are transmitted to the tool.

While I have described and illustrated but a single embodiment of my invention, it will be apparent to those skilled in the art that various changes, omissions, additions, and substitution may be made therein without departing from the spirit and scope of my invention, as set forth in the accompanying claims.

What I claim is:

1. A honing tool including, in combination, a tool body, a tool adjusting end, a plurality of separable sections joining said body and adjusting end, axially movable adjusting means extending from said body through said plurality of sections and adjusting end by which the tool body is adjusted in diameters, and means preventing said adjusting means from rotating relative to said sections.

2. A honing tool including, in combination, a tool body, a tool adjusting end, a plurality of separable sections joining said body and adjusting end, a plurality of separable adjusting means extending from said body through said plurality of sections and adjusting end by which the tool body is adjusted in diameters, and a spring carried by a section and engaging the adjusting means thereof for urging said means toward tool collapsed position.

3. In a honing tool including, in combination, a tool body, abrasive stones carried by said body, means for adjusting said stones radially, a driving end for said body having a universal connection therewith, guide bushings carried by said tool at each of its ends and by said driving end, means extending through said driving end having universal connection with said tool adjusting means, and a tubular extension releasably attached to said driving end, a longitudinally movable element within said tubular extension releasably secured to the extending means of said adjusting means, and means for preventing said movable element from turning relative to said tubular extension.

4. In a honing tool including, in combination, a tool body, abrasive stones carried by said body, means for adjusting said stones radially, a driving end for said body having a universal connection therewith, guide bushings carrier by said tool at each of its ends and by said driving end, means extending through said driving end having universal connection with said tool adjusting means, a tubular extension releasably attached to said driving end, a longitudinally movable element within said tube extension releasably secured to the extending means of said adjusting means, means for preventing said movable element from turning relative to said tubular extension, and an adjusting end releasably secured to said tubular extension having means for engaging and adjusting said longitudinally movable means.

5. In a honing tool including, in combination, a tool body, abrasive stones carried by said body, means for adjusting said stones radially, a driving end for said body having a universal connection therewith, guide bushings carried by said tool at each of its ends and by said driving end, means extending through said driving end having universal connection with said tool adjusting means, a tubular extension releasably attached to said driving end, a longitudinally movable element within said tube extension releasably secured to the extending means of said adjusting means, means for preventing said movable element from turning relative to said tubular extension, an adjusting end releasably secured to said tubular extension having means for engaging and adjusting said longitudinally movable means, and means projecting from said adjusting head for moving said adjusting means.

6. In an abrading tool, a tool body, a plurality of sets of abrasive stones mounted in said tool body with each set offset radially from its adjacent sets, an adjusting element provided with a plurality of sets of cams for moving said stones radially outward, spring means for moving said stones radially inward, and a pair of guide bushings at each end of the tool projecting beyond the stones when the stones are in retracted position.

7. In an abrading tool, a tool body, a plurality of sets of abrasive stones mounted in said tool body, each set offset radially from its adjacent sets, an adjusting element provided with a plurality of sets of cams for moving said stones radially outward, spring means for moving said stones radially inward, a pair of guide bushings at each end of the tool projecting beyond the stones when the stones are in retracted position, a driving end for said tool having universal connection therewith and provided with a guide bushing, and a rod having universal connection with said cam element projecting through said end and maintained against rotation relative thereto.

8. In an abrading tool, a tool body, a plurality of sets of abrasive stones mounted in said tool body with adjacent sets offset radially from one another, an adjusting element provided with a plurality of sets of cams for moving said stones radially outward, spring means for moving said stones radially inward, a pair of guide bushings at each end of the tool radially projecting beyond the stones when the stones are in retracted position, a driving end for said tool having universal connection therewith and provided with a guide bushing, a rod having universal connection with said cam element projecting through said end and maintained against rotation relative thereto, an adjusting head for said tool, and an attachable section joining said head to said driving end of the tool and provided with an adjusting element for connecting the rod of the driving end to said adjusting head.

9. In an abrading tool, a tool body, a plurality of sets of abrasive stones mounted in said tool body with one set offset radially from its adjacent sets, an adjusting element provided with a plurality of sets of cams for moving said stones radially outward, spring means for moving said stones radially inward, a pair of guide bushings at each end of the tool radially projecting beyond the stones when the stones are in retracted position, a driving end for said tool having universal connection therewith and provided with a guide bushing, a rod having universal connection with said cam element projecting through said end and maintained against rotation relative thereto, an adjusting head for said tool, an attachable section joining said head to said driving end of the tool and provided with an adjusting element for connecting the rod of the driving end to said adjusting head, driving means on said adjusting end, and means carried by said driving means by which said adjusting head is actuated.

10. In an abrading tool, a tool body, having adjustable means for radially positioning the abrasive stones thereof, an adjusting head by which the body is driven in rotation and adjusted to a predetermined diameter, a tubular section having a relatively movable element, a spring in said section for urging said element in a direction to collapse the stones of said tool body, and means for releasably attaching said section and element to said body, adjusting means and adjusting head.

11. In an abrading tool, a tool body, having adjustable means for radially positioning the abrasive stones thereof, an adjusting head by which the body is driven in rotation and adjusted to a predetermined diameter, a tubular section having a relatively movable element, a spring carried by said tubular section for urging said element in a direction to collapse the stones of said tool body, means for releasably attaching said section and element into said body, adjusting means and adjusting head, and means on said head by which said element and adjusting means are positioned.

12. In an abrading tool, a tool body, having adjustable means for radially positioning the abrasive stones thereof, an adjusting head by which the body is driven in rotation and adjusted to a predetermined diameter, a tubular section having a relatively movable element, a spring carried by said tubular section for urging said element in a direction to collapse the stones of said tool body, means for releasably attaching said section and element to said body, adjusting means and adjusting head, means on said head by which said element and adjusting means are positioned, and means on said adjusting head by which the adjusting means thereof may be shifted.

JOHN E. KLINE.